No. 877,875. PATENTED JAN. 28, 1908.
J. E. VAN NOSTRAN.
STOP COCK.
APPLICATION FILED MAR. 13, 1907.
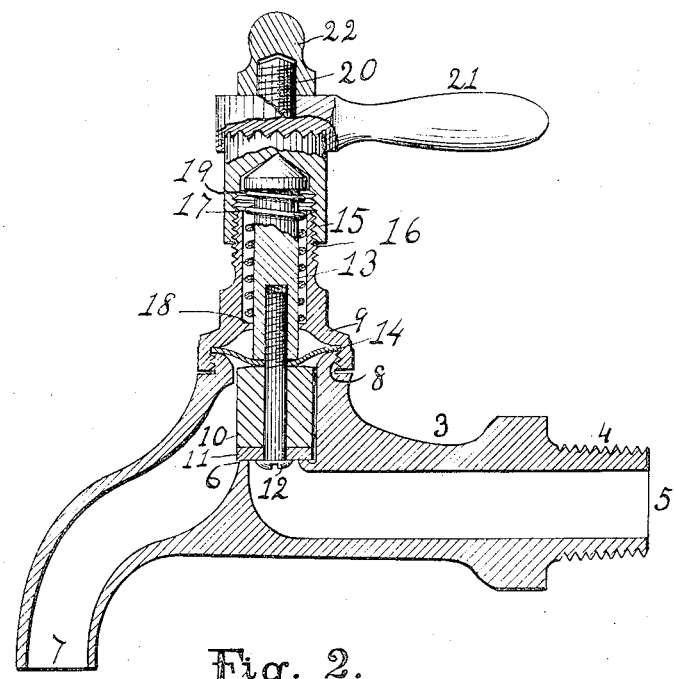
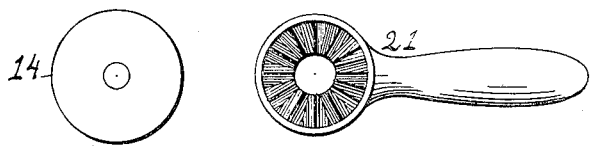
Witnesses
N. S. Waller
E. Gray.
Inventor
Joseph E. Van Nostran.
By W. X. Stevens
Attorney

UNITED STATES PATENT OFFICE.

JOSEPH E. VAN NOSTRAN, OF CANTON, OHIO, ASSIGNOR OF ONE-HALF TO GEORGE W. SHADE, OF CANTON, OHIO.

STOP-COCK.

No. 877,875.                Specification of Letters Patent.            Patented Jan. 28, 1908.

Application filed March 13, 1907. Serial No. 362,166.

*To all whom it may concern:*

Be it known that I, JOSEPH E. VAN NOSTRAN, a citizen of the United States, residing at Canton, in the county of Stark and State of Ohio, have invented new and useful Improvements in Stop-Cocks, of which the following is a specification.

This invention relates to cocks and faucets, and its object is first, to adapt a faucet to open freely under little or no water pressure; second, to provide means for preventing leakage at both the fixed and movable joints; third, to provide means for reducing to a minimum the wear upon the valve; and fourth, to adapt the turning lever or handle to be readily set at any desired point in its circle of revolution, when closed.

To this end my invention consists in the construction and combination of parts forming a stop-cock hereinafter more fully described and particularly set forth in the claims, reference being had to the accompanying drawings in which Figure 1 represents a longitudinal vertical section of a stop-cock according to my invention. Fig. 2 represents a plan view of the handle inverted, and Fig. 3 a top view of the rubber disk.

Numeral 3 represents the body of the stop-cock having a screw thread at 4 to connect it with a supply pipe in the usual manner, an entrance passage 5, a valve-seat 6, a discharge outlet 7, and at 8 a threaded neck to receive a cap 9.

10 represents the valve and 11 a packing washer secured to its lower end by a screw 12. This screw further serves to secure the stem 13 to the valve, and to bind between the valve and stem a disk 14. This disk is made of elastic material such as soft rubber and is rigidly secured at its outer edge between the cap 9 and body 3, and its central portion bends up and down to accommodate the movement of the valve in opening and closing, but it remains fixed as a tight packing for the joint between the valve and stem and between the cap and body.

15 represents a thimble which is screw-threaded at 16 upon the cap 9, and has a conical bearing for the upper end of the stem 13. A spring 17 acting between the shoulder 18 in the cap and the shoulder 19 on the stem presses the stem against the thimble, and when the thimble is screwed upwards the valve is opened. The thimble is provided with a screw extension 20 which passes through the head of the handle 21, and a nut 22 threaded upon the screw 20 binds the handle to the thimble. The thimble and handle are radially corrugated in their adjacent faces so that the wrinkles of the corrugations register together and hold the thimble securely to turn with the handle when the nut 22 is turned home, and yet, by loosening the nut a little the handle will be set free so that it may be turned around and located at any desired radial position on the thimble. By turning the handle to screw the thimble downward on the cap thread 16, the thimble will carry with it the stem 13 and the valve and close the valve. This movement is resisted by both the spring 17 and the elastic disk 14, and when the handle is turned to raise the thimble both the spring and the disk act in addition to whatever pressure there may be on the water in the cock to open the valve, yet the valve would be opened without the aid of the water pressure. The disk 14 secures absolutely tight joints at all times around both the valve stem and the cap, whether the stop-cock be used for air, steam, water or other fluid. As the valve and its stem do not rotate with the thimble the packing washer 11 moves directly to and from the valve seat in operation, thus avoiding the grinding wear that takes place in valves which must be rotated when pressed against their seats, both in closing them tightly and in opening them.

Having thus fully described my invention, what I believe to be new and desire to secure by Letters Patent is the following

The combination of a stop-cock body having a valve-seat in it; a cap upon the body; a thimble freely screw-threaded upon the cap; a valve fitted to the said seat and provided with a stem which passes through the said cap and has a conical bearing against the said thimble; a spring acting between the cap and the stem to force the latter to a bearing against the thimble; the thimble being provided with a screw-threaded extension and with a radially corrugated shoulder around the extension; a handle freely fitted upon the thimble stem and having radial corrugations to register with the corrugations on the thimble, and a nut screw-threaded upon the said extension, substantially as shown and described.

In testimony whereof I affix my signature, in presence of two subscribing witnesses.

JOSEPH E. VAN NOSTRAN.

Witnesses:
J. A. JEFFERS,
CHARLES HALLAM.